(12) United States Patent
Uhlianuk et al.

(10) Patent No.: US 9,005,712 B2
(45) Date of Patent: Apr. 14, 2015

(54) METHOD FOR FORMING A MULTILAYER COATING

(75) Inventors: Peter William Uhlianuk, Romeo, MI (US); Delson J Trindade, Rochester Hills, MI (US); Alan E Smith, Troy, MI (US); Brian J Ladd, Ortonville, MI (US)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 0 days.

(21) Appl. No.: 13/816,940

(22) PCT Filed: Aug. 19, 2011

(86) PCT No.: PCT/US2011/048434
§ 371 (c)(1),
(2), (4) Date: Feb. 14, 2013

(87) PCT Pub. No.: WO2012/024594
PCT Pub. Date: Feb. 23, 2012

(65) Prior Publication Data
US 2013/0142956 A1   Jun. 6, 2013

Related U.S. Application Data

(60) Provisional application No. 61/375,516, filed on Aug. 20, 2010.

(51) Int. Cl.
*B05D 7/16* (2006.01)
*C09D 167/02* (2006.01)
*B05D 7/00* (2006.01)

(52) U.S. Cl.
CPC ............ *C09D 167/025* (2013.01); *B05D 7/572* (2013.01); *B05D 2502/00* (2013.01); *B05D 2520/05* (2013.01); *B05D 2508/00* (2013.01)

(58) Field of Classification Search
USPC ............................................... 427/402, 372.2
See application file for complete search history.

(56) References Cited

U.S. PATENT DOCUMENTS

| | | | |
|---|---|---|---|
| 3,379,548 A | 4/1968 | Jen | |
| 4,389,502 A | 6/1983 | Fry | |
| 4,403,003 A | 9/1983 | Backhouse | |
| 4,888,373 A | 12/1989 | Abrams | |
| 4,900,774 A | 2/1990 | Mitsuji | |
| 5,025,061 A | 6/1991 | Ishidoya et al. | |
| 5,030,683 A | 7/1991 | Makamura | |
| 5,502,101 A | 3/1996 | Schwarte | |
| 5,589,228 A * | 12/1996 | Wegner et al. | 427/407.1 |
| 5,658,617 A | 8/1997 | Gobel | |
| 5,981,642 A | 11/1999 | Overbeek | |
| 6,228,974 B1 | 5/2001 | McCollum et al. | |
| 6,428,856 B1 | 8/2002 | Masuda | |
| 6,436,540 B1 | 8/2002 | Garcia | |
| 6,562,899 B2 | 5/2003 | Buter | |
| 6,863,929 B2 | 3/2005 | Watanabe et al. | |
| 7,022,759 B2 | 4/2006 | Martin | |
| 7,087,672 B2 | 8/2006 | Yuan | |
| 8,247,035 B2 | 8/2012 | Furusawa | |
| 2002/0013404 A1 | 1/2002 | Buter | |
| 2003/0212192 A1 | 11/2003 | Yuan | |
| 2005/0255330 A1 | 11/2005 | Meyer | |
| 2006/0121205 A1 | 6/2006 | Menovcik et al. | |
| 2006/0234404 A1 | 10/2006 | December et al. | |
| 2007/0110902 A1 * | 5/2007 | Johnson et al. | 427/372.2 |
| 2008/0131714 A1 | 6/2008 | Toi | |
| 2009/0269577 A1 * | 10/2009 | Lamers et al. | 428/336 |

FOREIGN PATENT DOCUMENTS

| | | |
|---|---|---|
| EP | 468293 A1 | 1/1992 |
| EP | 575859 A1 | 12/1993 |
| EP | 744412 | 11/1996 |
| EP | 0899314 A1 | 3/1999 |
| EP | 1331044 A1 | 7/2003 |
| EP | 2080776 A1 | 7/2009 |
| WO | 0153363 A1 | 7/2001 |
| WO | 0158987 | 8/2001 |
| WO | WO 2009/075389 A1 * | 6/2009 |

OTHER PUBLICATIONS

ISA USPTO, International Search Report and Written Opinion for PCT/US2011/048434, mailed Feb. 8, 2012.
ISA USPTO, International Preliminary Report on Patentability for PCT/US2011/048434, mailed Feb. 26, 2013.
European Patent Office, European Extended Search Report for Application No. 11818831.7, dated Dec. 11, 2014.

* cited by examiner

*Primary Examiner* — William Phillip Fletcher, III
(74) *Attorney, Agent, or Firm* — Ingrassia Fisher & Lorenz, P.C.

(57) ABSTRACT

The present disclosure is directed to a method of applying at least one layer of a waterborne primer composition, at least one layer of a waterborne basecoat composition and at least one layer of a clearcoat composition to a substrate followed by a heating step which simultaneously cures the applied layers of coating composition.

20 Claims, No Drawings

METHOD FOR FORMING A MULTILAYER COATING

FIELD OF THE DISCLOSURE

The present disclosure is directed to a method of forming a multilayer coating on a substrate. The method relates to the wet-on-wet-on-wet application of a waterborne primer composition, a waterborne basecoat composition and a clearcoat composition followed by the simultaneous curing of all three applied layers. The waterborne primer composition, the waterborne basecoat composition or both compositions comprise a waterborne or water dispersible polyester.

BACKGROUND OF DISCLOSURE

Coating systems for automobiles normally comprise a multiplicity of coatings applied to a steel substrate. Typically, the steel is treated with a rust-proofing phosphate layer, then a cathodic electrocoat primer for additional corrosion protection is applied and cured. A layer of a primer composition is then applied and cured to smooth the surface and also to provide chip resistance to the coating system during the normal course of driving. Then one or more layers of a basecoat composition is applied, with solid color and/or flake pigments to provide the color area for the substrate. This is followed by one or more layers of a clearcoat composition, to protect and preserve the attractive aesthetic qualities of the finish on the vehicle even on prolonged exposure to the environment or weathering.

Application of the basecoat and the clearcoat compositions is normally achieved by wet-on-wet application, which means that a layer of the clearcoat composition is applied to the applied basecoat composition without curing the basecoat layer prior to the application of the clearcoat composition. The applied layer of basecoat composition may be subjected to a flash dry step prior to the application of the clearcoat. Once both the basecoat and clearcoat compositions have been applied, they are subsequently heated to a sufficient temperature to form a dried and cured finish. In the conventional method for forming the multi-layer coating film, the applied layer of primer composition is cured by heating before the application of the basecoat and clearcoat compositions. Historically, cured primer compositions have been used not only to provide a smooth surface, but also to also prevent intermixing with the overlying basecoat and avoid disrupting the appearance of the overall finish. Resistance to intermixing (sometimes referred to as "strike-in" resistance) is especially important for the appearance of basecoats containing metallic pigment flakes. Any disturbance of the orientation of the metallic pigment flakes after application over the primer composition can detract from the metallic effect of the finish. Therefore, care must be taken to ensure that the metal pigment flakes are not disturbed after application.

In recent years, it has also been strongly desired to reduce the environmental load or impact of automotive assembly plants by reducing VOC (volatile organic compounds) emissions and CO2 (carbon dioxide) emissions generated from operating painting booths and baking ovens. This has led to use of lower solvent content in the paint, increased use of waterborne coating compositions and the development of "three wet paints" which make it possible to apply the primer, basecoat and clearcoat compositions wet-on-wet-on-wet before they are cured all at once in a single bake. With this simplified application process, it can be possible to eliminate the separate primer painting booth and primer oven and to reduce the manpower needed to inspect and remove defects from the cured primer, both of which results in substantial cost savings to the automobile manufacturers. The technical hurdles of this process simplification, however, have been significant. For instance, interfacial bleeding and aesthetic appearance, as well as film properties such as chip resistance are still significant concerns and have been significant barriers to commercialization of 3-wet paint systems. Another problem with existing 3-wet paints is the need to reformulate the clearcoat to resist intermixing with the basecoat.

STATEMENT OF THE DISCLOSURE

The present disclosure is directed to a method forming a multilayer coating on a substrate wherein the method is a 3-wet method comprising the steps of;
1) applying at least one layer of a waterborne primer composition;
2) applying at least one layer of a waterborne basecoat composition;
3) applying at least one layer of a clearcoat composition; and
4) heating the applied layers of coating composition to cure the applied layers;

wherein a polyester is present in the waterborne primer composition, in the waterborne basecoat composition or is present in both the waterborne primer composition and the waterborne basecoat composition;
wherein the polyester is a water soluble or water dispersible polyester that is the reaction product of a monomer mixture wherein the monomer mixture comprises;
  a) in the range of from 1 to 25 percent by weight of one or more polyalkylene glycol monoalkyl ethers having a number average molecular weight of less than 1600,
  b) in the range of from 40 to 65 percent by weight of one or more polycarboxylic acids, and
  c) in the range of from 35 to 60 percent by weight of one or more polyhydroxyl alcohols,
wherein the percentages by weight are based on the total weight of the polyester.

DETAILED DESCRIPTION

The features and advantages of the present disclosure will be more readily understood, by those of ordinary skill in the art, from reading the following detailed description. It is to be appreciated that certain features of the disclosure, which are, for clarity, described above and below in the context of separate embodiments, may also be provided in combination in a single embodiment. Conversely, various features of the disclosure that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including every value between the minimum and maximum values.

As used herein:

The term "3-wet" means the application of three different coating compositions to a substrate followed by the simultaneous curing of all three coating compositions. The curing of the applied layers is the first curing for each of the applied compositions.

The term "flash dry" means a step that removes at least a portion of the solvent from one or more applied layers of coating composition. The flash dry step is not intended to begin the curing process. In some embodiments, the flash dry step can remove at least 70 percent by weight of the liquid carrier from the applied coating composition. In other embodiments, the flash dry step can remove at least 80 percent by weight of the liquid carrier.

The phrase "one component" coating composition refers to a coating composition that comprises a film forming binder wherein the individual constituents of the film forming binder can be stored together at ambient temperatures (equal to or less than 25° C.) prior to use without crosslinking. Typical one component coating compositions can include hydroxyl functional oligomers and/or polymers and melamine resins. Other one component coating compositions can include those compositions wherein the film forming binders have both epoxy and acid functional groups.

The phrase "two component" coating composition refers to a coating composition that comprises a film forming binder wherein the individual constituents of the film forming binder cannot be stored together prior to their use. Typical two component coating compositions comprise, as a first component, hydroxyl functional oligomers and/or polymers and as a second component, polyisocyanate functional molecules. When combined, the hydroxyl and isocyanate functional groups can begin to react even at ambient temperatures.

The phrase "film forming binder" means those components that crosslink with one another to become a part of the final crosslinked network of the coating composition. Components that form a part of the coating composition but do not form a part of the crosslinked network such as, for example, pigments, stabilizers etc are not considered part of the film forming binder.

The term "essentially free from" means that a particular component is present at levels of less than 5 percent by weight. In other embodiments, the particular component is present at levels of less than 1 percent by weight. In still further embodiments, the particular component is present at levels of less than 0.1 percent by weight, wherein the percentages by weight are based on the total composition.

The present disclosure is directed to the 3-wet application of one or more layers of a waterborne primer composition, one or more layers of waterborne basecoat composition, followed by one or more layers of clearcoat composition. In some embodiments, the applied layer of primer composition is subjected to a flash dry step prior to the application of the layer of waterborne basecoat composition. In some embodiments, the applied layer of waterborne basecoat composition is subjected to a flash dry step prior to the application of the clearcoat composition. In still other embodiments, the applied layer of clearcoat composition is subjected to a flash dry step prior to the simultaneous curing of the applied layers.

The method for the 3-wet application of a waterborne primer composition, a waterborne basecoat composition and a clearcoat composition can comprise the use of a polyester in the waterborne primer composition, in the waterborne basecoat composition or in both of the waterborne primer and basecoat compositions. The use of this polyester allows the wet-on-wet-on-wet application while still providing the properties necessary for the rigorous demands of the automotive industry.

In some embodiments, the polyester is a water soluble or water dispersible polyester that is the reaction product of a monomer mixture, wherein the monomer mixture comprises or consists essentially of
 a) in the range of from 1 to 25 percent by weight of one or more polyalkylene glycol monoalkyl ethers having a number average molecular weight less than 1600;
 b) in the range of from 40 to 65 percent by weight of one or more polycarboxylic acids;
 c) in the range of from 35 to 60 percent by weight of one or more polyhydroxyl alcohols,
wherein the percentages by weight are based on the total weight of the polyester.

The polyester can have a weight average molecular weight in the range of from 25,000 to 85,000, a number average weight in the range of from 2,000 to 8,000, an acid number in the range of from 2 to 35 (mg KOH/g polyester). In other embodiments, the weight average molecular weight is in the range of from 35,000 to 75,000, the number average molecular weight is in the range of from 4,000 to 7,000 and the acid number is in the range of from 4 to 30. In still further embodiments, the weight average molecular weight is in the range of from 45,000 to 65,000, the number average molecular weight is in the range of from 5,000 to 6,000 and the acid number is in the range of from 4 to 25.

The polyalkylene glycol monoalkyl ether component may be represented by the formula:

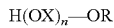

where X is —CH$_2$CH$_2$—, —CH(CH$_3$)CH$_2$—, —CH$_2$CH$_2$CH$_2$—, or a combination thereof, n is an integer of 7 to 25, and R is an alkyl group of 1 to 4 carbon atoms.

The polycarboxylic acid can include, for example, aromatic, aliphatic, and cycloaliphatic carboxylic acids, such as 1,4-cyclohexane dicarboxylic acid, 1,3-cyclohexane dicarboxylic acid, hexahydro-4-methylphthalic acid; tetrahydrophthalic acid, phthalic acid, isophthalic acid, trimellitic acid, adipic acid, azelaic acid, sebasic acid, succinic acid, maleic acid, glutaric acid, malonic acid, pimelic acid, suberic acid, fumaric acid, itaconic acid or a combination thereof. Esters and anhydrides of the above acids can also be employed and are encompassed by the term polycarboxylic acids.

Suitable polyhydroxyl alcohols can include diols, triols, and higher alcohols. In some embodiments, they can include trimethylolpropane, trimethylolethane, tris(hydroxyethyl) isocyanurate, glycerine, pentaerythritol, neopentyl glycol, dimethylol hydantoin, ethylene glycol, propylene glycol, 1,4-butylene glycol, diethylene glycol, dipropylene glycol, 1,4-cyclohexane dimethanol, neopentyl glycol monohydroxypivalate, 1,3-propane diol, 1,6-hexanediol, dimethylol propionic acid or combination thereof.

In some embodiments, any of the above described polyesters can be prepared by conventional condensation polymerization techniques using the previously described monomer mixtures. Polymerization is continued until the desired acid number and molecular weight are reached. In some embodiments, the polyester is the reaction product of a monomer mixture wherein the monomer mixture comprises or consists essentially of neopentyl glycol, trimethylol propane, methoxy polyethylene glycol, isophthalic acid, adipic acid and phthalic anhydride.

In order to help to disperse or solubilize the polyester in water, at least a portion of the acid groups can be neutralized with a base. The base can be an amine. In some embodiments, the base can be ammonia, alkyl amines, dialkyl amines, trialkyl amines, hydroxy functional alkyl amines or a combination thereof. In further embodiments, the base can be 2-amino-2-methyl-1-propanol, diethanol amine, triethanol amine, triethyl amine, n-methyl ethanol amine, amino methyl propanol, amino ethyl propanol, diethyl amine or a combination thereof.

Waterborne Primer

The waterborne primer composition comprises a film forming primer binder wherein the film forming primer binder comprises or consists essentially of in the range of from 20 to 90 percent by weight of the polyester and in the range of from 10 to 80 percent by weight of a crosslinking agent. In other embodiments, the film forming primer binder comprises or consists essentially of in the range of from 25 to 75 percent by weight of the polyester and in the range of from 25 to 75 percent by weight of a crosslinking agent, and in still further embodiments, the film forming primer binder can comprise in the range of from 30 to 70 percent by weight, of the polyester and in the range of from 30 to 70 percent by weight of a crosslinking agent. The percentages by weight are based on the total weight of the film forming primer binder.

Other film forming primer binders can be used with the polyester and the crosslinking agent. In some embodiments, suitable other film forming primer binders can include, for example, polyurethanes, polyethylene glycol, polypropylene glycol, polytrimethylene ether glycol, linear and/or branched acrylic polyols, acrylic latexes, aqueous latexes, acrylic microgels, aqueous microgels or a combination thereof. The other film forming primer binders, if present, can be present in the range of from 1 to 30 percent by weight. In other embodiments, the other film forming primer binders can be present in the range of from 5 to 25 percent by weight, and in still further embodiments, can be present in the range of from 10 to 20 percent by weight. All percentages by weight are based on the total weight of the film forming primer binder. Suitable crosslinking agents can include, for example, melamines, amino resins, polyisocyanates, blocked polyisocyanates or a combination thereof. In some embodiments, the waterborne primer coating composition is free from or essentially free from acrylic latexes, aqueous latexes, acrylic microgels, aqueous microgels or combinations thereof.

The waterborne primer coating composition can further comprise additives that are common for primers. Suitable additives can include, for example, pigments, rheology control agents, UV absorbers, light stabilizers, catalysts, surfactants, antifoam agents or combinations thereof.

Pigments suitable for use in a primer composition are well known in the art. Suitable pigments can include, for example, carbon black, titanium dioxide, iron oxides, silicon dioxide, zinc phosphate, barium sulfate, other colorants common in the art or a combination thereof. The pigment to film forming binder ratio, sometimes called the pigment to binder ratio or p/b ratio can be in the range of from 20/100 to 200/100. In other embodiments, the p/b ratio can be in the range of from 30/100 to 150/100, and, in still further embodiments, can be in the range of from 40/100 to 100/100.

In order to cure the applied compositions, the coating compositions can contain from about 0.1 to 2.0%, based on the weight of film forming binder, of a strong acid catalyst, or amine salt thereof. In one embodiment, the catalyst is aminomethyl propanol blocked dodecyl benzyl sulfonic acid, available as NACURE® 5225 or 3525 acid catalysts both available from King Industries, Norwalk, Conn. Phosphoric acid, and salts thereof, are also effective catalysts.

The waterborne primer coating composition can have a solids content in the range of from 25 to 80 percent by weight. In other embodiments, the solids content can be in the range of from 35 to 70 percent by weight and in still further embodiments, the solids content can be in the range of from 40 to 60 percent by weight. As used herein, the phrase "solids content" means the total amount of non-water and non-solvent ingredients in the coating composition. The waterborne primer coating composition can have liquid carrier ingredients other than water. In some embodiments, the liquid carrier is greater than 50 percent by weight water, and in other embodiments, the liquid carrier is greater than 60 percent by weight water, based on the total amount of liquid carrier.

Waterborne Basecoat

The waterborne basecoat composition comprises a film forming basecoat binder wherein the film forming basecoat binder comprises or consists essentially of in the range of from 10 to 60 percent by weight of the polyester, in the range of from 0 to 70 percent by weight of an acrylic latex and in the range of from 10 to 50 percent by weight of a crosslinking agent. In other embodiments, the film forming basecoat binder comprises or consists essentially of in the range of from 15 to 55 percent by weight of the polyester, in the range of from 10 to 60 percent by weight of an acrylic latex and in the range of from 15 to 40 percent by weight of a crosslinking agent, and in still further embodiments, the film forming basecoat binder can comprise or consist essentially of in the range of from 20 to 50 percent by weight of the polyester, in the range of from 20 to 50 percent by weight of an acrylic latex and in the range of from 17 to 25 percent by weight of a crosslinking agent. The percentages by weight are based on the total weight of the film forming basecoat binder.

In some embodiments, the waterborne basecoat composition can utilize the same or a different polyester than was used in the waterborne primer composition. If the polyester is not the same polyester as was used in the waterborne primer composition, it is produced under the parameters previously discussed. The waterborne basecoat composition and the waterborne primer composition are formulated differently due to the need for these two compositions to resist intermixing and to provide the necessary properties that primers and basecoats are expected to provide to a multilayer coating.

The acrylic latex can comprise in the range of from 0 to 70 percent by weight of the waterborne basecoat composition, wherein the percentage by weight is based on the total amount of film forming binder. Acrylic latexes are well known in the art and can be produced by the polymerization of a monomer mixture according any of the known methods. In some methods, Suitable monomers that can be used in the monomer mixture include (meth)acrylic acids and esters, for example, (meth)acrylic acid, methyl(meth)acrylate, ethyl(meth)acrylate, propyl(meth)acrylate, butyl(meth)acrylate, and 2-ethylhexyl(meth)acrylate, hydroxyalkyl(meth)acrylates, hydroxyethyl(meth)acrylates, hydroxypropyl(meth)acrylates or a combination thereof. Suitable other monomers can include vinyl acetate, vinyl propionate, acrylonitrile, styrene and vinyl toluene. Acrylic latex resins typically have internal crosslinking. In order to impart the internal crosslinking, a portion of the monomer mixture can include monomers that have two polymerizable ethylenically unsaturated groups such as, for example, ethylene glycol di(meth)acrylate, 1,6-hexane diol di(meth)acrylate, allyl(meth)acrylate or divinylbenzene. In other embodiments, the monomer mixture can include monomers carrying pairs of chemical groups which can be caused to react with one another either during or after the polymerization reaction, such as epoxy and carboxyl, for example, glycidyl methacrylate and (meth)acrylic acid; anhydride and hydroxyl, for example, maleic anhydride and hydroxyethyl(meth)acrylate; or isocyanate and hydroxyl, for example, 2-isocyanatoethyl(meth)acrylate and hydroxyethyl (meth)acrylate.

Other film forming basecoat binders can be used with the polyester and the optional acrylic latex. In some embodiments, suitable other film forming basecoat binders can include, for example, polyurethanes, polyethylene glycol, polypropylene glycol, polytrimethylene glycol linear and branched acrylic polyols, aqueous latexes, acrylic microgels, aqueous microgels or combinations thereof. Crosslinking agents can also be used as part of the film forming basecoat binder. Suitable crosslinking agents can include, for example, melamines, amino resins, polyisocyanates, blocked polyisocyanates or a combination thereof.

The waterborne basecoat composition can further comprise additives that are common for basecoats. Suitable additives can include, for example, pigments, rheology control agents, UV absorbers, light stabilizers, catalysts, antifoam agents or combinations thereof. Pigments suitable for use in a waterborne basecoat composition are well known in the art and can include, for example, carbon black, titanium dioxide, iron oxides, silicon dioxide, zinc phosphate, barium sulfate, azo pigments, phthalocyanine pigments, quinacridone pigments, pyrrolopyrrole pigments, perylene pigments, pearlescent pigments, metal oxide coated metal pigments, titanium dioxide coated aluminum, coated mica or pearl flakes, titanium dioxide coated mica, graphite effect pigments, plate-like iron oxide, plate-like copper phthalocyanine pigments or a combination thereof. The waterborne basecoat composition can have a p/b ratio in the range of from 2/100 to 150/100. In other embodiments, the p/b ratio can be in the range of from 3/100 to 100/100 and, in still further embodiments, can be in the range of from 8/100 to 75/100.

The waterborne basecoat composition can have a solids content in the range of from 10 to 50 percent by weight. In other embodiments, the solids content can be in the range of from 15 to 40 percent by weight and in still further embodiments, the solids content can be in the range of from 17 to 35 percent by weight. As used herein, the phrase "solids content" means the total amount of non-water and non-solvent ingredients in the coating composition. The waterborne primer coating composition can have liquid carrier ingredients other than water. In some embodiments, the liquid carrier is greater than 50 percent by weight water, and in other embodiments, the liquid carrier is greater than 60 percent by weight water, based on the total amount of liquid carrier.

Clearcoat Composition

The clearcoat composition can be any waterborne, solventborne or powder clearcoat compositions that are commercially available. In some embodiments, the clearcoat composition can be a one component clearcoat composition. In other embodiments, the clearcoat composition can be a two component clearcoat composition. In some embodiments, the clearcoat composition can be a one component epoxy acid clearcoat that is solventborne or waterborne. In other embodiments, the clearcoat composition is a silane clearcoat, an acrylosilane clearcoat, a hydroxyl silane clearcoat or a blocked isocyanate/melamine clearcoat. A suitable example of a one component clearcoat composition is GEN IV® clearcoat available from DuPont, Wilmington, Del.

Application Method

The disclosed coating compositions can be applied via a 3-wet application method. The 3-wet method comprises the steps of;

1) applying at least one layer of the waterborne primer composition;
2) applying at least one layer of the waterborne basecoat composition;
3) applying at least one layer of the clearcoat composition; and
4) heating the applied layers of coating composition to cure the applied layers.

In further embodiments, the method comprises the step of flash drying the applied layer of waterborne primer composition prior to the application of the waterborne basecoat composition. The flash drying step can be done at ambient temperature for a time period of 1 second to 30 minutes or more at temperatures in the range of from ambient to 100° C. In still further embodiments, the flash drying step can be performed first at ambient temperature for 1 second to about 20 minutes followed by heating at a temperature in the range of from above ambient temperature to about 100° C. for 1 second to 20 minutes.

In still further embodiments, the method can further comprise the step of flash drying the applied layer of waterborne basecoat composition prior to the application of the clearcoat composition. The flash drying step can be done at ambient temperature for a time period of 1 second to 30 minutes or more at temperatures in the range of from ambient to 100° C. In still further embodiments, the flash drying step can be performed first at ambient temperature for 1 second to about 20 minutes followed by heating at a temperature in the range of from above ambient temperature to about 100° C. for 1 second to 20 minutes.

In still further embodiments, the method can further comprise the step of flash drying the applied layer of clearcoat composition prior to the step of heating the applied layers of coating compositions. The flash drying step can be done at ambient temperature for a time period of 1 second to 30 minutes or more at temperatures in the range of from ambient to 100° C. In still further embodiments, the flash drying step can be performed first at ambient temperature for 1 second to about 20 minutes followed by heating at a temperature in the range of from above ambient temperature to about 100° C. for 1 second to 20 minutes.

Once the layers of waterborne primer composition, waterborne basecoat composition and clearcoat composition have been applied, the layers are then heated to cure the coating compositions. The heating step is performed at a temperature that can at least partially remove any remaining liquid carrier and to cure the applied layers of coating compositions. In some embodiments, the heating step is carried out at an oven temperature in the range of from 130° C. to 200° C. The substrate can have a residence time in the oven from 5 minute to 60 minutes. The temperatures described for the flash dry and for the heating steps refers to the temperature of the oven or the heating device that the coated substrate is passed through or placed in during the particular step.

Also disclosed is a substrate having applied thereon a dried and cured multi-layer coating according to the described method. Suitable substrates include, for example, automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, trailers, recreational vehicles, including but not limited to, motor homes, campers, conversion vans, vans, pleasure vehicles, pleasure craft snow mobiles, all terrain vehicles, personal watercraft, motorcycles, boats and aircraft; coil coating; railroad cars; printed circuit boards; machinery; OEM tools; signage; fiberglass structures; sporting goods; and sporting equipment.

EXAMPLES

Unless otherwise specified, all chemicals are available from the Aldrich Chemical Company, Milwaukee, Wis.

Hexyl CELLOSOLVE®, butyl CELLOSOLVE® and DOWANOL® PNB solvents are available from Dow Chemical, Midland, Mich.

ARCOL® PPG-425 polyether is available from Bayer Materials Science, Pittsburgh, Pa.

CYMEL® 303 melamine is available from Cytec Industries, Stamford, Conn.

FOAMSTAR® I-300 is available from Cognis North America, Cincinati, Ohio.

HOSTAVIN® 3310 UV absorber is available from the Clariant Corporation, Charlotte, N.C.

AMP® 95 is available from Ashland, Columbus, Ohio.

ISOPAR® H is available from ExxonMobil, Houston, Tex.

VISCALEX® HV30 acrylic is available from BASF, Florham Park, N.J.

LAPONITE® silicate is available from Southern Clay Products, Gonzales, Tex.

Preparation of Polyurethane A

An intermediate polyester was prepared by reacting 512.95 grams of 1,6-hexane diol, 342.105 grams of adipic acid and 180.37 grams of isophthalic acid at a maximum temperature of 250° C. Water was collected from the reaction mixture until an acid number of 3 was reached. The polyester was cooled and used as is.

TABLE 1

| Ingredient | Amount (grams) |
| --- | --- |
| Portion 1 | |
| Dimethylol propionic acid | 12.08 |
| Intermediate Polyester | 220.72 |
| N-methyl-2-pyrrolidone | 92.1 |
| Portion 2 | |
| Isophorone diisocyanate | 82.98 |
| N-methyl-2-pyrrolidone | 13.04 |
| Portion 3 | |
| 20% dimethyl isopropanolamine in water | 41.93 |
| Water | 342.37 |
| Portion 4 | |
| Water | 55.4 |
| Ethylene diamine | 3.69 |
| Portion 5 | |
| Water | 59.90 |

The ingredients of Table 1, portion 1 were added to a reactor and were heated to 65° C. to dissolve the dimethylol propionic acid. Dissolution was complete after about 3.5 hours. The ingredients of portion 2 were added to the reactor over a 10 minute period and the reaction was allowed to exotherm to 75° C. After the addition was complete, the reaction mixture was stirred for 4 hours at 75° C. The mixture was then cooled to 35° C. and the ingredients of portion 4 were added all at once and mixed for 5 minutes. The ingredients of portion 5 were added and the polyurethane dispersion was used as is. The solids content of the polyurethane was determined to be 35.5%.

Preparation of Polyester 1

A polyester was prepared by forming a mixture of 359.9 parts of neopentyl glycol, 134.2 parts of trimethylol propane, 104.5 parts of methoxy polyethylene glycol (Mw 550), 103.8 parts of isophthalic acid, 438.5 parts of adipic acid, 103.6 parts of phthalic acid in 248.9 parts of xylene. The mixture was heated to 230° C. and the temperature was maintained at 230° C. to 240° C. until 140.5 parts of water was distilled off. The mixture was cooled to 100° C. and 129.5 parts of DOWANOL® DPM and 129.5 parts of butanol were added. The acid number of the polyester was determined to be 9.12, the weight average molecular weight was 56,225 and the number average molecular weight was 8430.

Preparation of Comparative Polyester

A polyester was prepared by forming a mixture of 268.98 parts of neopentyl glycol, 283.1 parts of adipic acid, 67.47 parts of methoxy polyethylene glycol, 86.62 parts of trimethylol propane, 66.88 parts of phthalic anhydride, and 67.04 parts of isophthalic acid. The mixture was heated to 235° C. and water was removed by distillation. When the acid number was between 6 and 7, the reaction mixture was cooled to 160° C. and 84.71 parts of dipropylene glycol methyl ether was added. The reaction was further cooled to 100° C. and 84.71 parts of butanol was added. The polyester was determined to have a weight average molecular weight of 6039 and a number average molecular weight of 1914.

Preparation of Acrylic Latex

An acrylic polymer is produced by polymerizing a monomer mixture comprising 2.3 parts of allyl methacrylate, 35.6 parts of methyl methacrylate, 58.2 parts of butyl acrylate, 2.3 parts of hydroxyl ethyl acrylate and 1.6 parts of methacrylic acid. The acrylic latex had a solids content of 35 percent by weight in water.

Preparation of Waterborne Primer and Comparative Waterborne Primer Compositions

| Ingredient | Waterborne Primer A | Comparative Waterborne Primer B |
| --- | --- | --- |
| | amount (parts by weight) | |
| Polyurethane A | 7.85 | 7.85 |
| Hexyl CELLOSOLVE ® | 0.87 | 0.87 |
| ARCOL ® PPG-425 | 1.20 | 1.20 |
| FOAMSTAR ® I-300 | 0.57 | 0.57 |
| Catalyst A[1] | 0.73 | 0.73 |
| HOSTAVIN ® 3310 | 0.31 | 0.31 |
| AMP ® 95 | 0.20 | 0.20 |
| DOWANOL ® PNB | 1.91 | 1.91 |
| ISOPAR ® H | 2.82 | 2.82 |
| CYMEL ® 303 | 8.14 | 8.14 |
| Polyester 1 | 16.37 | 0 |
| Comparative polyester | 0 | 16.37 |
| Butyl CELLOSOLVE ® | 1.68 | 1.68 |
| $TiO_2$ dispersion | 29.85 | 29.85 |
| carbon black dispersion | 5.79 | 5.79 |
| VISCALEX ® HV30 | 0.11 | 0.11 |
| Deionized water | 21.60 | 21.60 |

1. Dodecyl benzene sulfonic acid neutralized 110% with 2-amino-2-methyl-1-propanol, 38% solids in water.

The ingredients of the waterborne primers were added to a suitable vessel and were stirred to mix. The compositions were used as is.

Preparation of Waterborne Basecoat and Comparative Waterborne Basecoat Compositions

| Ingredient | Waterborne Basecoat A | Comparative Waterborne basecoat B |
|---|---|---|
| LAPONITE ® dispersion[1] | 15.15 | 15.15 |
| Acrylic Latex | 16.60 | 16.60 |
| FOAMSTAR ® I-300 | 0.48 | 0.48 |
| catalyst A[2] | 0.84 | 0.84 |
| AMP ® 95 | 0.06 | 0.06 |
| DOWNAOL ® PNB | 8.01 | 8.01 |
| ISOPAR ® H | 2.55 | 2.55 |
| CYMEL ® 303 | 5.32 | 5.32 |
| Polyester 1 | 10.55 | 0 |
| Comparative polyester | 0 | 10.55 |
| Butyl CELLOSOLVE ® | 2.42 | 2.42 |
| Aluminum dispersion[3] | 27.73 | 27.73 |
| Deionized water | 10.29 | 10.29 |

1. Dispersion of 2.8% LAPONITE ® in 3% ARCOL ® PPG-425
2. Dodecyl benzene sulfonic acid neutralized 110% with 2-amino-2-methyl-1-propanol, 38% solids in water.
3. Dispersion of 11% aluminum flake in 18% acrylic latex.

The ingredients of the waterborne basecoat compositions were added to a suitable vessel and were stirred to thoroughly mix the ingredients. The compositions were used as is.

Four steel panels were coated with a layer of the waterborne primer composition A and four steel panels were coated with comparative primer composition B. The compositions were applied using an electrostatic turbobell spray gun to have a dry film build of 20 micrometers. The applied waterborne primer compositions were flash dried for 90 seconds at ambient temperature and then heated for 3 minutes at 82° C. The panels were then allowed to cool to room temperature before application of the waterborne basecoats.

Two of the panels that were coated with a layer of waterborne primer composition A, were then coated with waterborne basecoat composition A and two panels coated that were coated with a layer of waterborne primer A were then coated with comparative waterborne basecoat B. Two of the panels coated that were coated with a layer of comparative primer composition B were then coated with a layer of waterborne basecoat composition A and the two remaining panels that were coated with a layer of comparative primer composition B were then coated with a layer of comparative waterborne basecoat composition B.

Each of the waterborne basecoat compositions was applied using an electrostatic turbobell spray gun to a dry film build of 15 micrometers. The applied layer of basecoat composition was flash dried for 90 seconds at ambient temperature and then for 3 minutes at 82° C. The panels were then cooled to room temperature prior to application of the clearcoat composition.

To each of the panels was applied a clearcoat composition. The clearcoat composition was applied using an electrostatic turbobell spray gun to provide a dry film thickness of 40 micrometers. The panels were flash dried for 8½ minutes at room temperature and then baked in a 140° C. oven for 30 minutes. One each of the panels was baked in a horizontal position and one each was baked in a vertical position. The combined Ford number of the panels were assessed. The results are shown in Table 2.

TABLE 2

| Waterborne Primer Composition | Waterborne Basecoat Composition | Combined Ford number (vertical/horizontal) |
|---|---|---|
| comparative B | comparative B | 44/53 |
| A | comparative B | 43/55 |
| comparative B | A | 47/54 |
| A | A | 52/64 |

The results show that the presence of the higher molecular weight polyester 1 in each of the layers provides substantially better appearance values to both vertical and horizontal panels, when compared to that of primer and basecoat compositions having the comparative (relatively lower molecular weight) polyester.

What is claimed is:

1. A method for forming a multilayer coating on a substrate wherein the method is a 3-wet method comprising the steps of;
    1) applying at least one layer of a waterborne primer composition;
    2) applying at least one layer of a waterborne basecoat composition;
    3) applying at least one layer of a clearcoat composition; and
    4) heating the applied layers of coating composition to cure the applied layers;
   wherein a polyester is present in the waterborne basecoat composition;
   wherein the polyester is a water soluble or water dispersible polyester that is the reaction product of a monomer mixture wherein the monomer mixture comprises;
      a) in the range of from 1 to 25 percent by weight of one or more polyalkylene glycol monoalkyl ethers having a number average molecular weight of less than 1600,
      b) in the range of from 40 to 65 percent by weight of one or more polycarboxylic acids, and
      c) in the range of from 35 to 60 percent by weight of one or more polyhydroxyl alcohols,
   wherein the percentages by weight are based on the total weight of the polyester.

2. The method of claim 1 wherein the waterborne basecoat composition comprises a film forming basecoat binder wherein the film forming basecoat binder comprises in the range of from 10 to 60 percent by weight of the polyester; in the range of from 0 to 70 percent by weight of an acrylic latex; and in the range of from 20 to 80 percent by weight of a crosslinking agent; and
   wherein the percentages by weight are based on the weight of the film forming basecoat binder, and wherein polyester resin has an acid number in the range of from 2 to 35, a weight average molecular weight in the range of from 25,000 to 85,000, and the acid groups are at least partially neutralized with a base.

3. The method of claim 2 wherein the film forming basecoat binder comprises in the range of from 15 to 55 percent by weight of the polyester resin, in the range of from 10 to 60 percent by weight of an acrylic latex and in the range of from 15 to 40 percent by weight of a crosslinking agent, wherein the percentages by weight are based on the total amount of film forming basecoat binder.

4. The method of claim 2 wherein the polyester has a weight average molecular weight in the range of from 35,000 to 75,000.

5. The method of claim 1 wherein the film forming primer composition comprises a film forming primer binder wherein the film forming primer binder comprises in the range of from 20 to 90 percent by weight of the polyester and in the range of from 10 to 80 percent by weight of a crosslinking agent; wherein the percentages by weight are based on the total amount of film forming primer binder, and wherein polyester resin has an acid number in the range of from 2 to 35, a weight average molecular weight in the range of from 25,000 to 85,000, and the acid groups are at least partially neutralized with a base.

6. The method of claim 5 wherein the film forming primer binder comprises in the range of from 25 to 75 percent by weight of the polyester and in the range of from 25 to 75 percent by weight of the crosslinking agent, wherein the percentages by weight are based on the total amount of film forming primer binder.

7. The method of claim 5 wherein the waterborne primer composition is essentially free from acrylic latex.

8. The method of claim 5 wherein the polyester has a weight average molecular weight in the range of from 35,000 to 75,000.

9. The method of claim 1 wherein the method further comprises the step of flash drying the applied one or more layers of waterborne primer composition prior to the application of the waterborne basecoat composition, or wherein the method further comprises the step of flash drying the applied one or more layers of waterborne basecoat composition prior to the application of the clearcoat composition, or wherein the method further comprises the step of flash drying the applied layer of clearcoat composition prior to the step of heating the applied layers of coating compositions.

10. The method of claim 1 wherein the heating step comprises heating the applied layers of coating composition to a temperature in the range of from 130° C. to 200° C.

11. The method of claim 1 wherein the clearcoat composition is a one component clearcoat composition.

12. The method of claim 1 wherein the polyester is present in the waterborne primer composition.

13. The method of claim 12 wherein the monomer mixture consists essentially of:
 a) neopentyl glycol,
 b) trimethylol propane,
 c) methoxy polyethylene glycol,
 d) isophthalic acid,
 e) adipic acid, and
 f) phthalic anhydride.

14. The method of claim 1 wherein the polyester is present in the waterborne basecoat composition.

15. The method of claim 1 wherein the polyester is present in both the waterborne primer composition and in the waterborne basecoat composition.

16. The method of claim 1 wherein a first polyester is present in the waterborne primer composition and a second polyester different from the first polyester is present in the waterborne basecoat composition.

17. A method for forming a multilayer coating on a substrate wherein the method is a 3-wet method comprising the steps of;
 1) applying at least one layer of a waterborne primer composition;
 2) applying at least one layer of a waterborne basecoat composition;
 3) applying at least one layer of a clearcoat composition; and
 4) heating the applied layers of coating composition to cure the applied layers;
 wherein a polyester is present in the waterborne primer composition, in the waterborne basecoat composition or is present in both the waterborne primer composition and the waterborne basecoat composition;
 wherein the polyester is a water soluble or water dispersible polyester that is the reaction product of a monomer mixture wherein the monomer mixture comprises;
  a) neopentyl glycol,
  b) trimethylol propane,
  c) methoxy polyethylene glycol,
  d) isophthalic acid,
  e) adipic acid, and
  f) phthalic anhydride.

18. A method for forming a multilayer coating on a substrate wherein the method is a 3-wet method comprising the steps of;
 1) applying at least one layer of a waterborne primer composition;
 2) applying at least one layer of a waterborne basecoat composition;
 3) applying at least one layer of a clearcoat composition; and
 4) heating the applied layers of coating composition to cure the applied layers;
 wherein a polyester is present in the waterborne primer composition;
 wherein the polyester is a water soluble or water dispersible polyester that is the reaction product of a monomer mixture wherein the monomer mixture comprises;
  a) in the range of from 1 to 25 percent by weight of one or more polyalkylene glycol monoalkyl ethers having a number average molecular weight of less than 1600,
  b) in the range of from 40 to 65 percent by weight of one or more polycarboxylic acids, and
  c) in the range of from 35 to 60 percent by weight of one or more polyhydroxyl alcohols,
 wherein the percentages by weight are based on the total weight of the polyester.

19. The method of claim 18 wherein the film forming primer composition comprises a film forming primer binder wherein the film forming primer binder comprises in the range of from 20 to 90 percent by weight of the polyester and in the range of from 10 to 80 percent by weight of a crosslinking agent; wherein the percentages by weight are based on the total amount of film forming primer binder, and wherein polyester resin has an acid number in the range of from 2 to 35, a weight average molecular weight in the range of from 25,000 to 85,000, and the acid groups are at least partially neutralized with a base.

20. The method of claim 19 wherein the film forming primer binder comprises in the range of from 25 to 75 percent by weight of the polyester and in the range of from 25 to 75 percent by weight of the crosslinking agent, wherein the percentages by weight are based on the total amount of film forming primer binder.

* * * * *